Patented Nov. 17, 1931

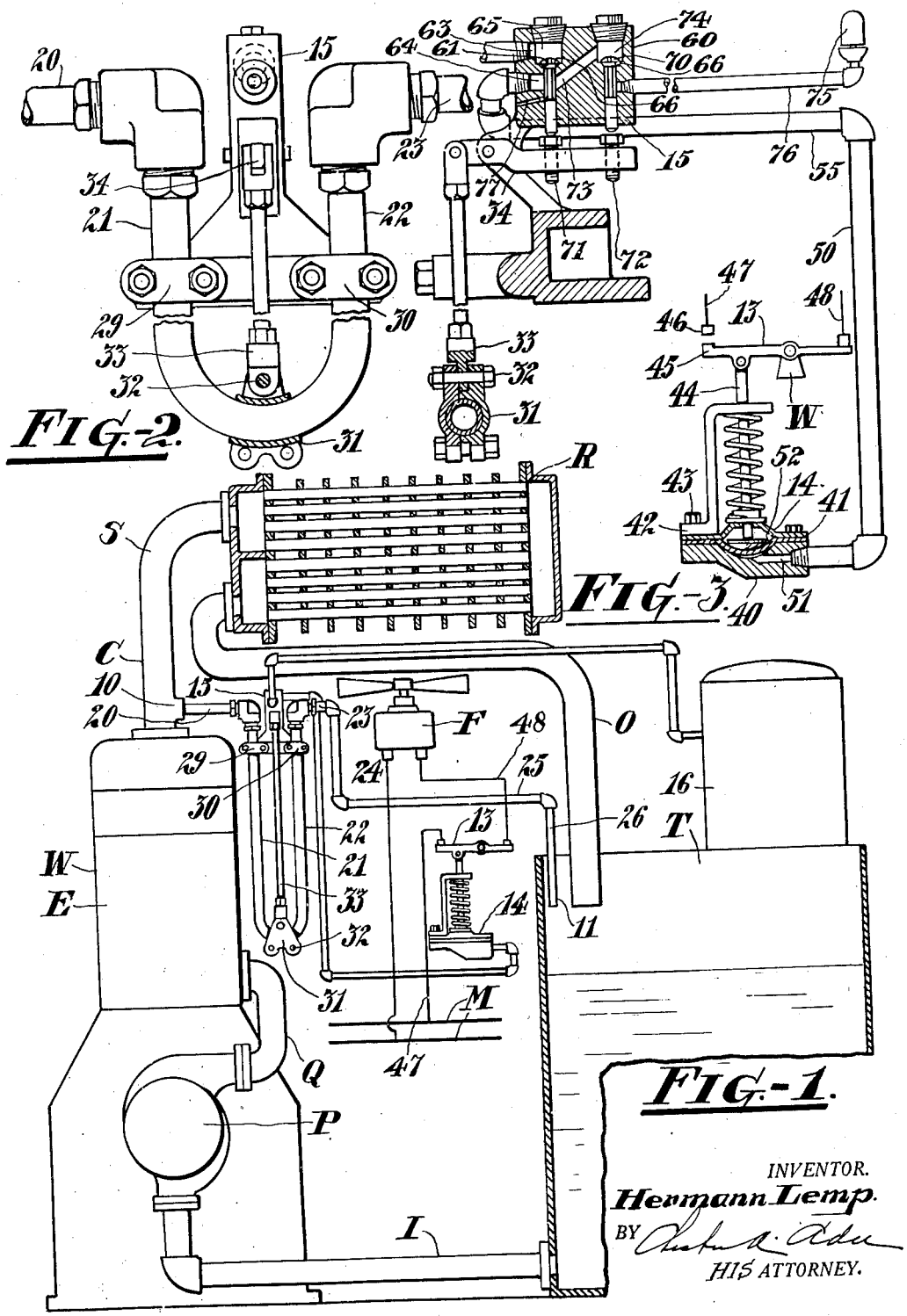

1,831,961

UNITED STATES PATENT OFFICE

HERMANN LEMP, OF GLEN ROCK, NEW JERSEY, ASSIGNOR TO INGERSOLL-RAND COMPANY, OF JERSEY CITY, NEW JERSEY, A CORPORATION OF NEW JERSEY

THERMOSTATIC CONTROL FOR RADIATOR FAN MOTORS

Application filed February 19, 1929. Serial No. 341,183.

This invention relates primarily to an apparatus for maintaining a constant water temperature in the cooling system of a traction oil engine, but the principles of the invention may be extended to include the cooling system of any type of engine or any forced feed cooling system.

As is well known, the present type of radiators for traction engines are usually cooled artificially by means of fan motors which in many instances are electrically driven from a main generator. One difficulty often present in the use of this system is that the ordinary radiator provided for this purpose is generally too small to properly cool the water. In order to correct this condition, certain cooling arrangements depend upon manual control of the electric fan motor furnishing air to the radiator. A thermometer is located in front of the operator and when the temperature of the water exceeds a predetermined degree, the operator closes the motor circuit to start the fan going and when the temperature becomes excessively low he stops the motor. This method similarly has a disadvantage in that much unnecessary work is imposed upon the operator and accordingly it is an object of this invention to provide an apparatus that will maintain the water at a substantially constant low temperature automatically without any attention on the part of the operator.

A second object of the invention is to provide a thermostatic control which is extremely simple in its construction. Convenience of arrangement of parts, lightness, durability and small cost of manufacture are further desirable features that have been borne in mind in the production and development of this invention.

With these and other objects in view, which will more readily become apparent as the nature of this invention is better understood, the same consists in the novel construction, combination and arrangement of parts set forth in the accompanying drawings, in which Figure 1 is an elevation of the automatic thermostatic control showing a preferred arrangement of parts whereby the water in the cooling system is maintained substantially at a constant temperature. In this view certain parts are shown in section to more clearly reveal the nature of the invention.

Figure 2 is an enlarged view in side elevation of the actual theremostatic element employed in the present thermostatic control system, and Figure 3 is a sectional view showing the relation of the thermostatic control element to the pneumatically operated and electrically controlled fan motor switch.

In all the above mentioned views like characters of reference are employed to designate like parts throughout, and the device involves in its general organization an engine E having a cooling system designated as an entirety by C and comprising generally a pump P having a connection Q to the water jacket W of the engine. The connection S leading from the engine E, the radiator R, the outlet pipe O, the tank T and the intake line I form the remaining parts of the cooling system.

The above mentioned parts are purely conventional in their design, the same having been in general use prior to the date of this application and no claim is made as to the novelty of these parts. The invention resides particularly in the thermostatic control for maintaining the water in the cooling system at a substantially constant temperature and the means whereby this is accomplished will now be more fully described.

The connection or manifold S is provided with a by-pass leading from a point 10 to the overflow point 11 in the tank T and the outstanding features of the invention are directly associated with this by-pass. Designated by F is an electrically operated fan preferably positioned directly behind the radiator R and arranged so that when it is in operation, it will direct a current of air through the radiator vanes. The fan F may receive its current from any suitable power line such as that shown at M. One lead from the fan to the power line is intercepted by a cut-off switch 13 (Figure 3). This switch is adapted to be operated through a piston 14 which is operated from a valve 15 by pressure fluid in a tank 16, the valve 15 being actuated by the thermostat control element to be more fully described hereinafter.

The arrangement of the foregoing described elements is such that when water in the radiator R reaches a high temperature the thermostatic control element causes the valve 15 to be opened to permit pressure fluid to actuate the piston 14 and close the switch 13 to set the fan F in operation.

The several units comprising the by-pass thermostatic control system will be treated separately and reference will first be had to the thermostatic element itself which is shown in Figure 2.

This element comprises a pipe section 20 which leads from the outlet 10 in the manifold S. From the pipe 20 the by-pass extends downwardly as at 21, thence upwardly as at 22 and communicates with the tank T through a series of pipe connections 23, 24, 25 and 26. Thus the thermostatic control element is U-shaped, having parallel arms 21 and 22. The upper ends of the arms 21 and 22 are securely clamped by brackets 29 and 30. The base of the U-shaped thermostatic element has a bracket 31 clamped thereto by means of bolts 32 and a rod 33 is secured with one end to this bracket. The rod 33 leads to a rocker arm 34 operating the valve 15 to open or close the pressure fluid connection between the piston 14 and the tank 16.

While the thermostatic element may be formed in any suitable manner and of any suitable material, it is preferable to form the same of a metal having a high coefficient of expansion, such as German silver, brass or the like. Thus it will be seen that any variations in temperature of fluid passing through the by-pass will materially affect the operation of the valve 15.

The piston 14 is of the diaphragm type and consists of a casing 40, having a plate 41 secured thereto by means of cap screws 43 and between the casing and plate is interposed a diaphragm 52, contacting with a plunger 44, extending through the plate 41. The casing 40 is provided with an inlet 51 communicating with the diaphragm 52. The inlet 51 is connected to the valve 15 through the connection 55. The plunger 44 has a rocker arm 13 pivoted thereto. This rocker arm has a contactor 45 at one end adapted to register with a terminal 46 of a lead 47 connected to the line M when the plunger is in its elevated position. The other end of the rocker arm may be permanently connected to a second lead 48 connected to the fan F.

The valve 15 is of any conventional design and comprises a casing 60 having a seat 61 therein. The casing has inlet and outlet ports 63 and 64 respectively communicating with a chamber 65. The actual valve element 66 is adapted to seat on the valve seat 61 when the plunger 33 is in its elevated position.

The means so far described are intended to keep the motor, through the medium of the cooling fluid, at a temperature at which it will operate most efficiently. As is well known, however, circumstances arise at times when, due to various causes, the cooling means provided for the purpose are inadequate to maintain this temperature and the motor may become heated to an excessive degree. Unless this condition is at once detected and promptly corrected, great damage may be caused to the motor. The present invention includes means for automatically apprising the attendant of this undesirable condition within the motor. The means provided for this purpose comprises a valve 70 similar in all essential respects to the valve 66 and also disposed in the casing 60. Like the valve 66 the stem thereof projects from the lowermost surface of the casing 60 although the stem of the valve 70 may be somewhat shorter than that of the valve 61.

Both the valves 66 and 70 are located directly above the rocker arm 34 and the rocker arm carries a pair of screws 71 and 72 adapted to bear against the stems of the valves 66 and 70 respectively for opening them. By employing screws, such as 70 and 72, adjustments may be effected to cause said screws to actuate the valves at different elevations of the rocker arm 34.

In the casing 60 is a passage 73 for conveying pressure fluid from the chamber wherein the valve 66 is located to a chamber 74 into which the valve 70 is adapted to extend in the open position.

In the drawings is illustrated a safety device in the form of a whistle 75 connected to the casing 60 by a pipe 76 and the admission of pressure fluid to the whistle 75 for operating it is controlled by the valve 70.

In order to permit the piston 14 to return to its seat and in that way separate the contactor 45 and the terminal 46, the casing 60 is provided with an exhaust port 77 which, in the closed position of the valve 66, will be in communication with the port 64. The port 77 is so located that in the open position of the valve 66, a portion of the valve will overlie said port and thus prevent the escape of pressure fluid to the atmosphere.

The above mentioned parts are believed to adequately define the invention and a full description of the operation of the device will now ensue. When the pump P is in operation and fluid is passing through the motor and cooling system at a moderate temperature, the fan F is inoperative. However, when the temperature of the water becomes unduly high the fluid passing through the by-pass and thermostatic control element, the latter being expansive, is elongated, and as the bracket 31 is carried downwardly the plunger 33 operates to open the valve 66. The opening of this valve permits air pressure in the tank 16 to be applied through the line 55 to the under side of the diaphragm 52 of the piston 14. As the piston 14 is operated the plunger 44 is elevated and the contactor 45 contacts with the terminal 46 of the lead 47, and thus the motor is set in operation to cool the fluid in the radiator.

After the cooling liquid, and therefore the motor, has again been cooled to a low temperature, the plunger 33 will contract and permit the valve 61 to return to its seat and thus cut-off the supply of pressure fluid to the piston 14. The pressure fluid utilized for actuating the piston 14 will then escape to the atmosphere through the passage 77. This is the operation of the device when operating under normal conditions. In the event, however, that for some reason the temperature of the cooling liquid reaches an excessive degree, the elongation of the plunger 33 resulting therefrom cause the rocker arm 34 to oscillate to a higher level and unseat the valve 70. When this takes place, pressure fluid will flow from the chamber 74 into and through the pipe 76 to the safety device, such as the whistle, and sound an alarm or such other pressure actuated device as may be connected to receive pressure fluid from the valve 70.

It is apparent that many changes may be resorted to in the details of construction. The invention is not necessarily limited to use in connection with traction oil engines. In fact, its association with engines of any type or design is contemplated.

I claim:

1. The combination with a motor having a circulating fluid cooling system including a radiator, of a by-pass shunting said radiator, a thermostat in said by-pass responsive to changes in fluid temperature in the by-pass, an electric motor driven fan positioned so as to direct a current of air against said radiator, and means actuated by said thermostat to connect the electric motor with a source of electrical current for setting the fan in operation when the fluid in the by-pass attains a predetermined temperature.

2. The combination with a motor having a circulating fluid cooling system and including a radiator, of a by-pass shunting said radiator, a thermostat in said by-pass and responsive to variations of fluid temperatures in the by-pass, a pressure fluid line having a valve therein, said valve being operable by the thermostat to permit pressure fluid to pass therethrough, an electric motor driven fan positioned to direct a current of air against said radiator, a switch for closing an electrical circuit to the fan motor, and a piston controlled by the valve and operable by pressure fluid in the pressure line for closing the switch.

3. The combination with a motor having a circulating fluid cooling system including a radiator, of a by-pass shunting said radiator and leading from a point in the cooling system intermediate the radiator and the motor, a thermostat in the by-pass, a pressure fluid line having a valve therein connected to the thermostat whereby fluid pressure will be transmitted through the pressure fluid line when fluid in the by-pass attains a predetermined temperature, an electrically operated fan positioned to direct a current of air against said radiator, a switch for setting said fan in operation, and a fluid actuated spring pressed plunger in the pressure fluid line and being controlled by the valve for closing and opening the switch.

4. The combination with a motor having a circulating cooling system including a radiator, of a by-pass shunting said radiator, a thermostat in said by-pass responsive to the temperature of fluid in the by-pass, an electric fan positioned to direct a current of air against said radiator, a switch for closing a circuit to the fan motor, a piston operable by pressure fluid for closing the switch, conveying means for supplying pressure fluid to the piston, a valve in the conveying means operable by the thermostat to expose the piston to pressure fluid for closing the switch when the fluid in the by-pass attains a predetermined temperature, and a second valve in the conveying means and adapted to be actuated by the thermostat for controlling the admission of pressure fluid to a safety device whenever the temperature of the fluid in the by-pass reaches a degree at which it is unsafe to operate the motor.

In testimony whereof I have signed this specification.

HERMANN LEMP.